US007263060B1

(12) United States Patent
Garofalo et al.

(10) Patent No.: US 7,263,060 B1
(45) Date of Patent: Aug. 28, 2007

(54) MULTIPLE SWITCH PROTECTED ARCHITECTURE

(75) Inventors: Michael M. Garofalo, Portsmouth, NH (US); Gene M. Ciancaglini, Dover, NH (US); Muriel Medard, Arlington, MA (US); James A. Hart, Rochester, NH (US)

(73) Assignee: Network Appliance, Inc., Sunnyvale, CA (US)

( * ) Notice: Subject to any disclaimer, the term of this patent is extended or adjusted under 35 U.S.C. 154(b) by 1059 days.

(21) Appl. No.: 10/186,303

(22) Filed: Jun. 27, 2002

Related U.S. Application Data (60) Provisional application No. 60/301,669, filed on Jun. 28, 2001.

(51) Int. Cl.
*G01R 31/08* (2006.01)
(52) U.S. Cl. ........................................ 370/217; 370/218
(58) Field of Classification Search ............... None
See application file for complete search history.

(56) References Cited

U.S. PATENT DOCUMENTS

| 5,680,235 | A | 10/1997 | Johansson | |
|---|---|---|---|---|
| 6,392,989 | B1* | 5/2002 | Jardetzky et al. | 370/216 |
| 6,625,115 | B1* | 9/2003 | Ikeda et al. | 370/217 |
| 6,639,893 | B1* | 10/2003 | Chikenji et al. | 370/217 |
| 6,657,952 | B1 | 12/2003 | Shiragaki et al. | |
| 6,771,907 | B1 | 8/2004 | Yoshifuji et al. | |
| 6,934,248 | B1* | 8/2005 | DeBoer et al. | 370/217 |
| 7,002,968 | B1* | 2/2006 | Tomizawa et al. | 370/395.52 |
| 7,027,447 | B2* | 4/2006 | Robertson et al. | 370/395.62 |
| 7,046,619 | B2* | 5/2006 | Alagar et al. | 370/216 |
| 7,058,007 | B1 | 6/2006 | Daruwalla et al. | |
| 7,130,263 | B1* | 10/2006 | Ong et al. | 370/223 |
| 7,133,357 | B2* | 11/2006 | Tada | 370/219 |
| 2002/0003639 | A1 | 1/2002 | Arecco et al. | |
| 2002/0088003 | A1 | 7/2002 | Salee | |
| 2002/0181503 | A1* | 12/2002 | Montgomery, Jr. | 370/468 |

OTHER PUBLICATIONS

Modiano, Eytan, et al., "A Novel Medium Access Control Protocol for WDM-Based LAN's and Access Networks using a Master/Slave Scheduler", Journal of Lightwave Technology, vol. 18, No. 4, Apr. 2000, pp. 461-468.
Medard, Muriel, et al. "A Network Management Architecture for Robust Packet Routing in Mesh Optical Access Networks", LEOS Summer Topical Mettings, Jul. 2000, 35 pages.

* cited by examiner

*Primary Examiner*—Phirin Sam
(74) *Attorney, Agent, or Firm*—Blakely Sokoloff Taylor & Zafman LLP (57) ABSTRACT

A multiple switch architecture is presented. The architecture includes two or more switches on a ring wherein interconnection between the switches allows one switch to generate control and scheduling commands to the other switch.

16 Claims, 7 Drawing Sheets

Prior Art

*Figure 1*

Prior Art

*Figure 2*

Prior Art

Figure 3

Prior Art

*Figure 4*

Prior Art

MULTIPLE SWITCH PROTECTED ARCHITECTURE

CROSS REFERENCE TO RELATED APPLICATIONS

This application claims the benefit of provisional patent application No. 60/301,669 filed Jun. 28, 2001, the disclosure of which is incorporated by reference herein, and to the patent application titled "FAULT TOLERANT OPTICAL DATA COMMUNICATION NETWORK", filed on even date herewith, the disclosure of which is incorporated by reference herein, and to the patent application titled "FAULT TOLERANT OPTICAL DATA COMMUNICATION NETWORK HAVING AUTO DISCOVERY", filed on even date herewith, the disclosure of which is incorporated by reference herein.

BACKGROUND OF THE INVENTION

Switches that are used as part of a network are well known. A switch is defined as any entity, in the network, that provides some ability to transfer input traffic to some outputs, possibly with some actions being performed on the traffic, such as merging, dropping, policing, etc . . . Switches include routers, ATM switches, Fibre Channel switches, switched Gigabit Ethernet, SONET switches or optical switches. The term "cabling" as used herein denotes any means of connecting entities in the network, be they fibers, coax cables, wireless links or cables within a single hardware unit that encompasses several logical units. The term "connectors" is used to denote any means of transmitting on cables. These connectors may be themselves part of switches, may be located at different nodes, and may have a variety of functions and capabilities beyond mere transmission.

The problem of recovery with redundant switches in a network is a problem that arises in most networks that seek to be failure-redundant, from enterprise networks to backbone networks. Redundancy is necessary to maintain operation even in the case of failure. Redundancy is desirable in the case of cabling failure, of connector failures, or of switch failures. There are several known approaches to recovery that are used in enterprise networks and networks using similar architectures to enterprise networks. These architectures are generally characterized by having single point-to-point links from the nodes to switches in configurations that are akin to stars or combinations of stars. Also known is a general method of recovering from failures in SONET networks and networks using related architectures, such as optical networks. These networks are generally arranged as rings or other mesh topologies, in which nodes may be switches themselves.

Figure 1:
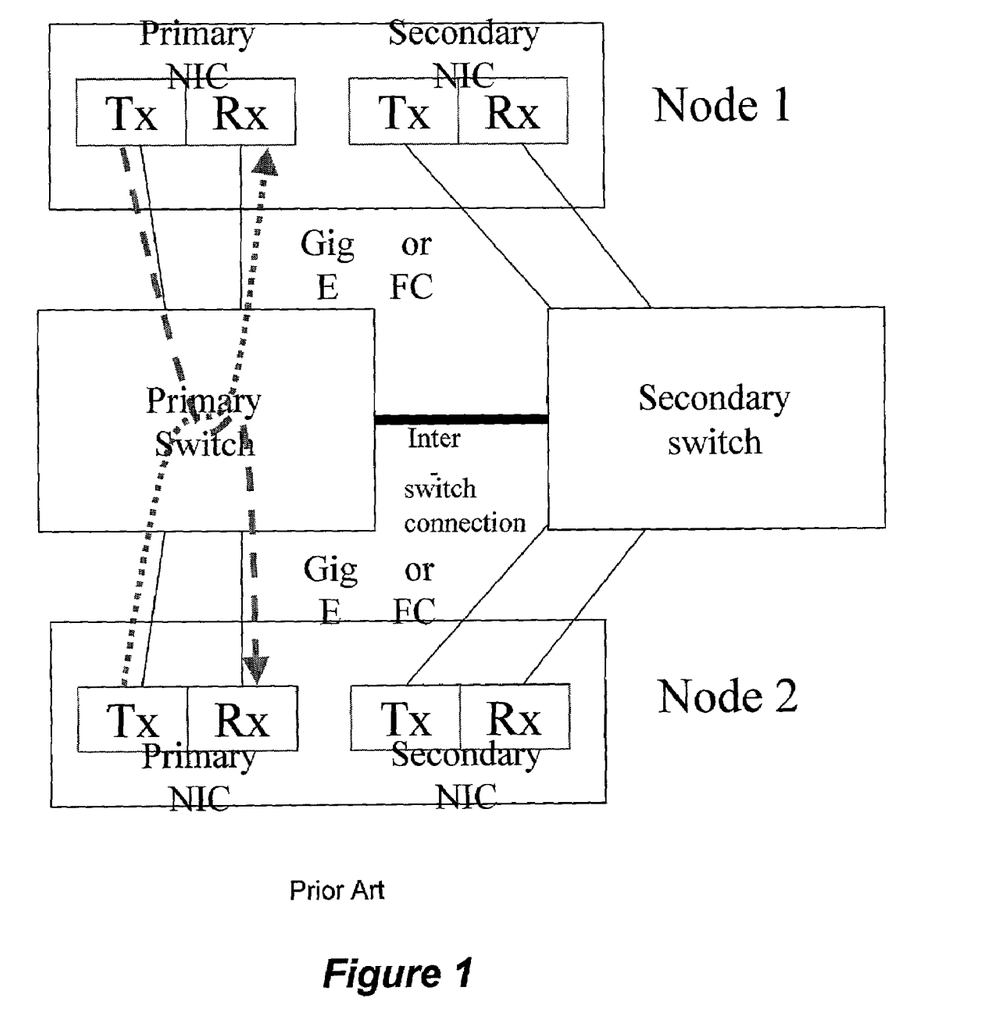
FIG. 1 is a block diagram of a prior art switch configuration.
Figure 2:
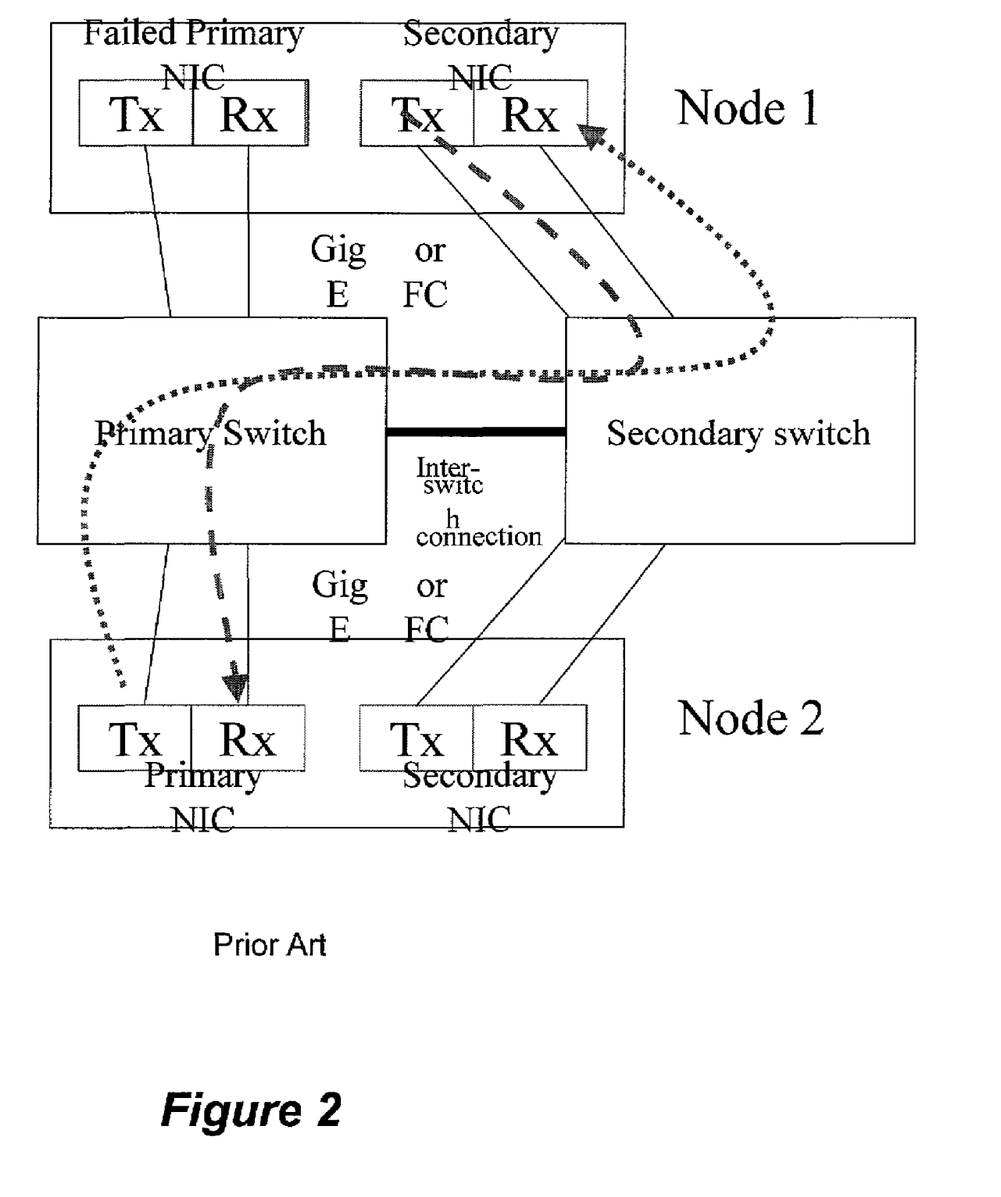
FIG. 2 is a diagram of the switch configuration of FIG. 1 showing a failure on node 1.
Figure 3:
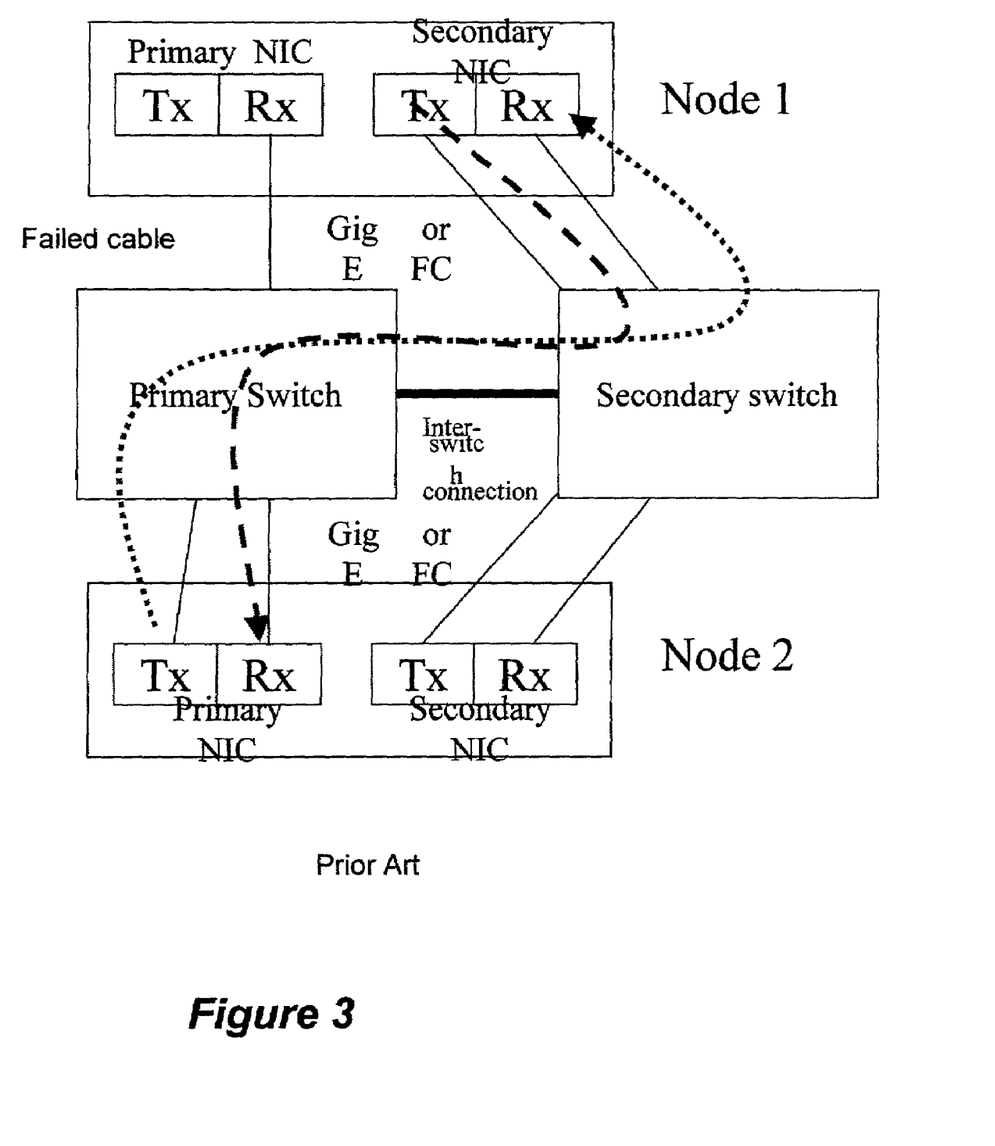
FIG. 3 is a diagram of the switch configuration of FIG. 1 showing a cabling failure.

In networks using point-to-point links, cabling is brought from connectors at nodes in the network to switches. A common configuration is shown in FIG. 1. The nodes may be servers that use network interface cards (NICs) as connectors. The cables may be fiber cables, and the switch for instance may be Gigabit Ethernet or Fibre Channel switch. The nodes in the networks that need to be provided with recovery ability have two or more NICs each. The connectors at the switch are generally referred to as ports. In the case of failure of a connector, another connector on the same node is used to provide recovery. Generally the second NIC provides a connection to a second switch, generally referred to as secondary switch, which provides redundancy to the first switch, generally referred to as primary switch. After failure of a NIC or a cable, the secondary switch connects to the primary switch through a connection between the two switches, as shown in FIG. 2 for a NIC failure and as shown in FIG. 3 for a cable failure.

Figure 4:
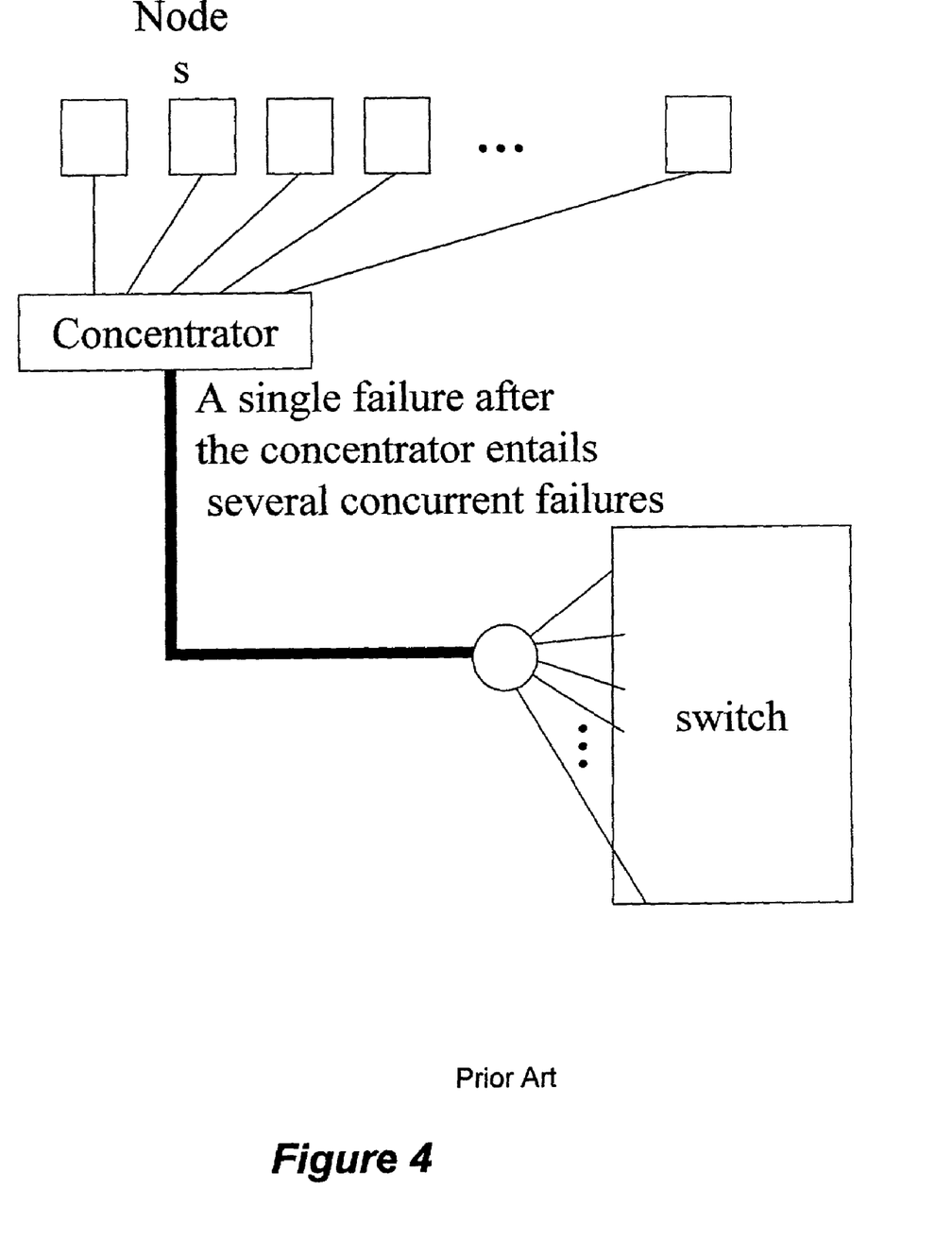
FIG. 4 is a block diagram of a concentrator and switch arrangement.

The capacity of the connection between the two switches, which may possibly be colocated in the same chassis, is a limitation on the recovery capability of the network. Indeed, cabling practices seldom allow for physical separation of cables, since such separation would require diverse physical paths and greatly impact the ability of the network manager to oversee network layout. In certain cases, as shown in FIG. 4, cables from several nodes are brought together either by physical attachment or through multiplexing at a concentrator, and a connection from the concentrator to the switch completes the link between the nodes and the switch. In that case, a single cut or disconnection in the connection between the concentrator and the switch may entail the concurrent failure of several cables, as shown in FIG. 4. In that case, the ability to recover the connection between the nodes and the switch may be limited by the inter-switch connection. Indeed, the ability to recover from multiple cable failures, possibly caused by a single failure as shown in FIG. 4, would require a number of ports at the switch to be as high as the number of possible failures in order to provide recovery. Since ports are generally a dominant portion of cost for switches, such the extension of recovery shown in FIG. 3 to the case where we have several concurrent cable failures (as would be the case in FIG. 4 if a breach were to occur in the connection between the concentrator and the switch) would be costly.

An alternative approach to having several ports dedicated to the inter-switch interconnection is to have all nodes use the secondary NICs and the secondary switch. However, this option generally requires the network to become temporarily logically disconnected and then re-connected through a cold start. This recovery involves a significant disruption of services. While such a wholesale shift from the primary switch to a secondary switch is required when the primary switch fails, it is generally desirable to prevent a single failure to cause service disruption to a large number of nodes.

In an architecture using rings or a general mesh configuration, nodes are generally also switches and the connections are arranged as rings or interconnections of rings. An example is that of rings in SONET. Within a single ring, a failure of a node is recovered through path protection in unidirectional path switched rings (UPSRs) or through loop-back in bidirectional line switched rings (BLSRs). When two rings are interconnected, the means of recovery generally presented for failures occurring in nodes interconnecting two or more rings in SONET is that of matched nodes.

Figure 5:
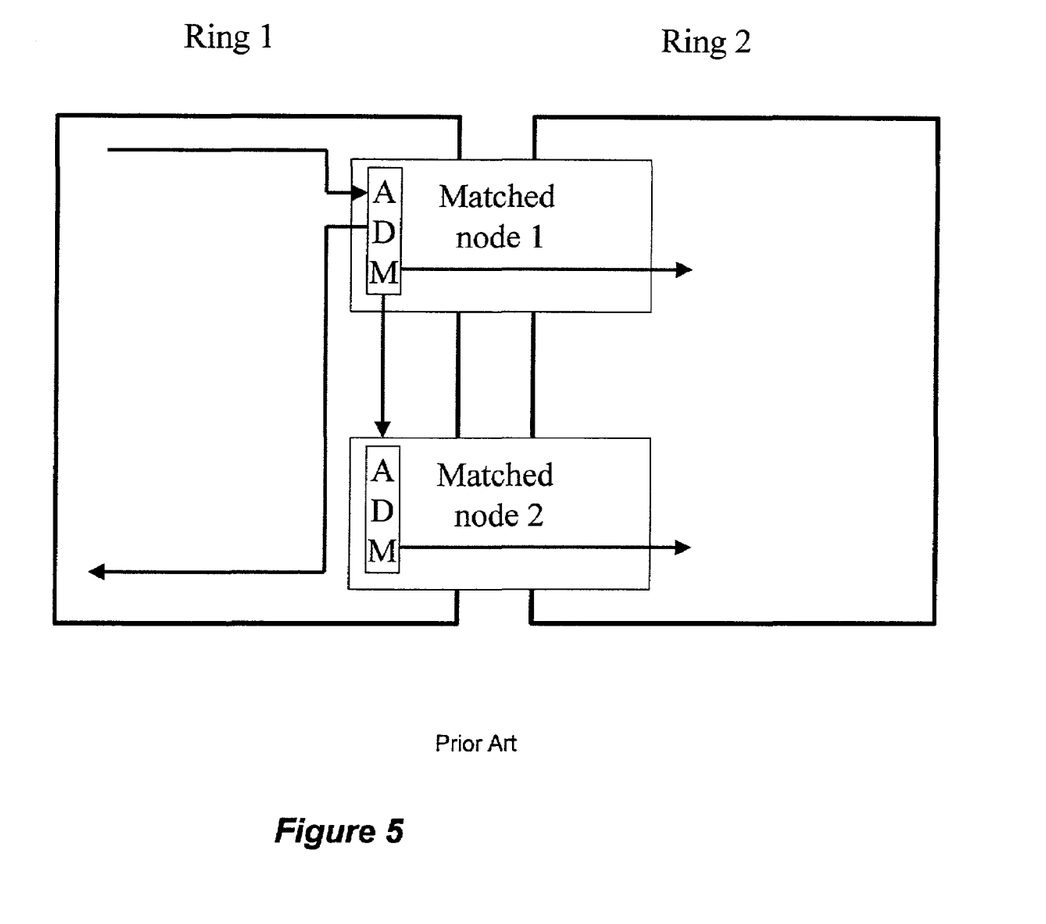
FIG. 5 is a block diagram showing multiple rings and matched nodes.

As shown I FIG. 5, in matched nodes, a switch or node acts as the primary means of interconnection between two nodes, and a secondary node only acts as such an interconnection in the case where the primary node fails. The primary node and the secondary nodes are usually referred to as matched nodes 1 and 2, respectively. The nodes generally operate in the following manner. Matched node 1 houses an add-drop multiplexer (ADM) that performs a drop-and-continue operation, in which it transfers signals from one node to another, and also send a replica of those signals to matched node 2. In case of failure of matched node 1, matched node 2 acts as the interconnections means between rings 1 and 2. There are several drawbacks to this technique. Failures at matched node 1 may be partial, including the failure of the ADM itself, and recovery in that case is complicated. Further, wholesale failure of matched node 1 may require loopback to occur in each ring, as well as having matched node 2 become the new interconnection between the rings. The timing issues associated within such triple recovery steps are generally difficult. In particular, distributed scheduling over the two rings may cause failures and heavy dependence on timing issues. Finally, the matched node may itself have connections to other nodes, such as routers, that are outside the SONET rings. In that case each of the matched nodes require ports to those routers or other nodes, thus increasing the number of ports.

In view of the foregoing it would be desirable to provide a multiple switch protection architecture. It would be further desirable to provide the architecture wherein recovery is possible in the event of cable failure, link failure, partial failures, and when several rings fail simultaneously.

SUMMARY OF THE INVENTION

With the foregoing background in mind, it is an object of the present invention to provide a multiple switch architecture having two or more switches on a ring wherein interconnection between the switches allows one switch to generate control and scheduling commands to the other switch.

BRIEF DESCRIPTION OF THE DRAWINGS

The invention will be better understood by reference to the following more detailed description and accompanying drawings in which.

DETAILED DESCRIPTION

A multiple switch protected (MSP) architecture is presented. The architecture allows for recovery in the case of cable, switch or connector failures without any loss of traffic. The benefits with respect to traditional methods of providing recovery in networks with redundant switches are that there is no minimum cut in the network that precludes all traffic in the network to be handled after recovery, that is recovery of link failures is accomplished with no loss of data.

The MSP architecture includes two or more switches and several nodes in a network with all nodes and switches placed on a single ring. The MSP architecture further includes an interconnection among switches that allows one switch to generate control and/or scheduling commands to some other switch(es), so that some switches may be running as slaves to others, to avoid issues of distributed scheduling The ring comprises at least 4 links per node. Note that the term "link" as used herein is a logical notion rather than a physical one. Two links could be separate fibers or cables; two wavelengths on a same fiber (possibly counterpropagating); different time slots on the same wavelength; or similar means of establishing virtual links or connections.

Figure 6:
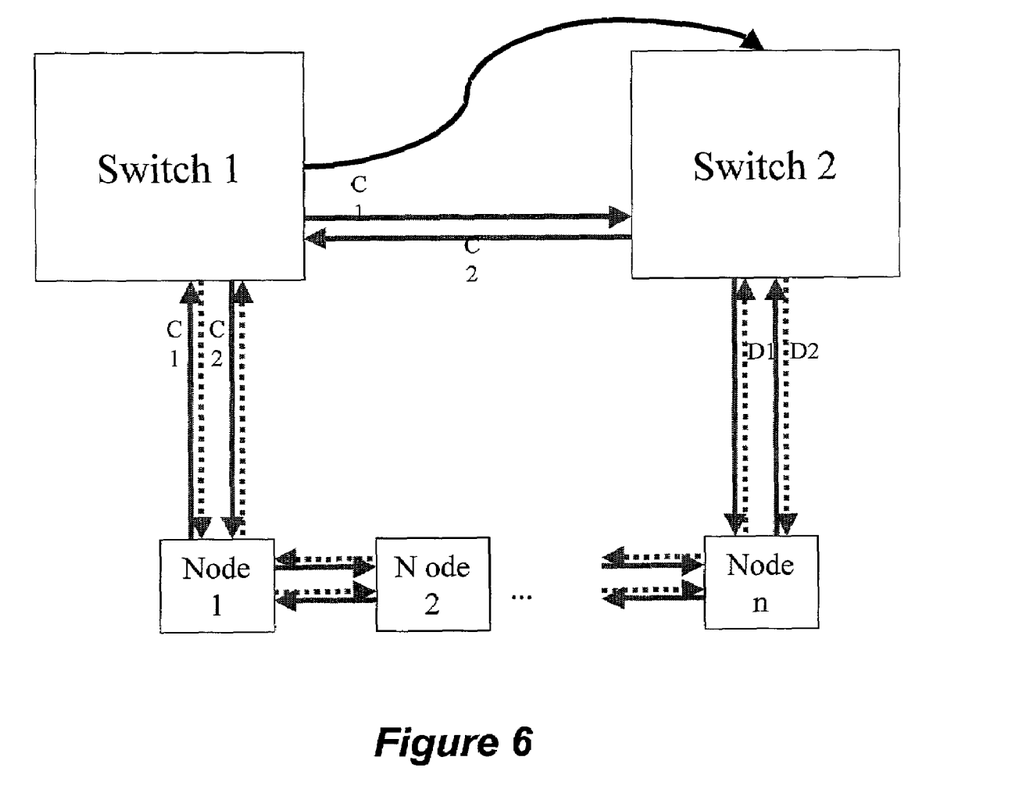
FIG. 6 is a block diagram of the multiple switch protected architecture.

Referring now to FIG. 6 the main components of the MSP architecture are shown. The collection links, designated C1 and C2, collect traffic to be sent to the switches from the nodes and from other switches. Distribution links, designated D1 and D2 distribute traffic from the switches and from other nodes to the nodes. Between the switches, only the collection links C1 and C2 are provided.

The operation under normal conditions is as follows. The nodes transmit on C1 for switch 1 and on C2 for switch 2. Switch 1 transmits to nodes on D1. Switch 2 transmits to nodes on D2. Switch 1 transmits a duplicate of C1 to Switch 2, thus Switch 2 has a copy of the collection traffic for Switch 1. Switch 2 transmits a duplicate of C2 to Switch 1, providing Switch 1 with a copy of the collection traffic for Switch 2. Switch 2 generates D2 using the C1 it receives from Switch 1. If there is a transmission of control and/or scheduling from Switch 1 to Switch 2, then Switch 2 can generate D2 from C1 as slave to Switch 1 and D2 is a replica (possibly delayed) of D1. Switch 2 can also generate its own control and scheduling and, under correct operating conditions, D2 should still be a duplicate or close approximation of D1.

Note that the duplication of C1 or C2 can be effected in a variety of manners, such as using an ADM in drop and continue mode, or using a passive optical splitter, or by regenerating the stream after electronic processing.

Figure 7:
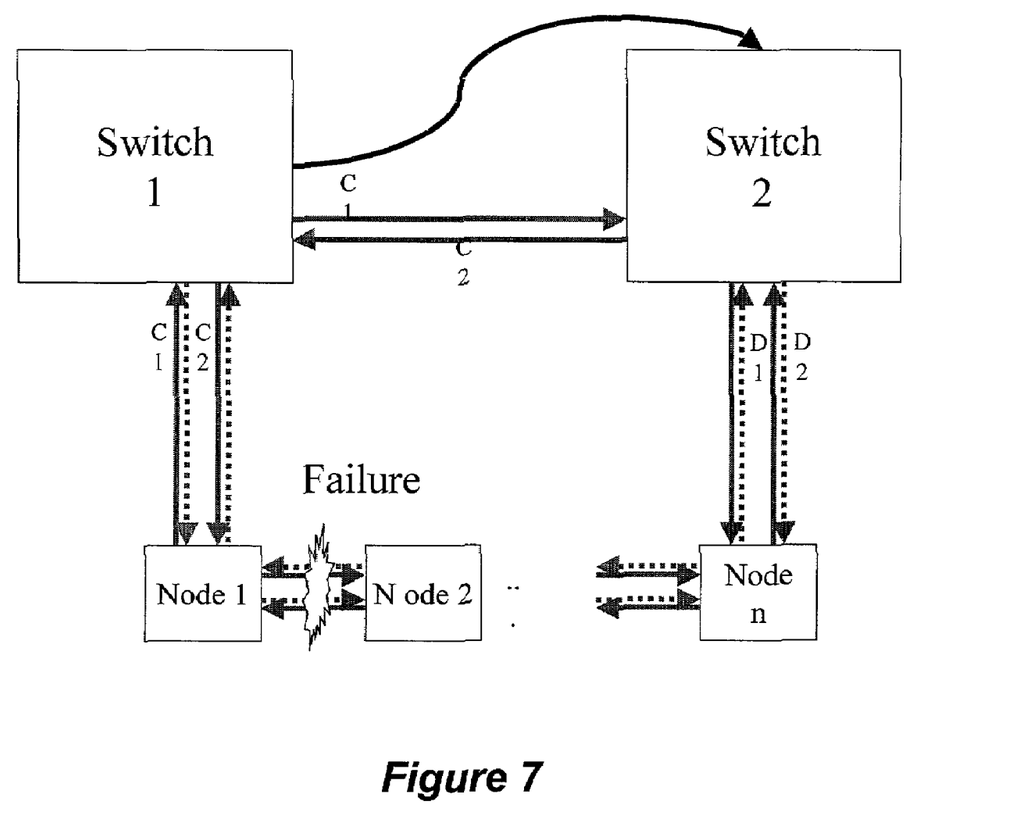
FIG. 7 is a block diagram of the multiple switch protected architecture showing a failure between two nodes.

In the event that a failure occurs, affecting one or all the links between two nodes, then recovery can be effected as follows. FIG. 7 shows the case where the failure occurs between nodes 1 and 2. Switch 1 receives the traffic from node 1 via C1. It receives the traffic from nodes 2 through n via C2, transmitted through Switch 2. Switch 2 receives the traffic for nodes 2 through n via C2 and the traffic from node 1 via C1, transmitted through Switch 1. Switch 1 combines the traffic from C1 and C2 to generate D1. Switch 2 combines the traffic from C1 and C2 to generate D2. Node 1 receives traffic on D1. Nodes 2 through n receive traffic on D2. Note that, in an alternate architecture, Switch 1 can have an extra link to transmit D1 to Switch 2 and Switch 2 can place D1 onto D2.

Note that the presently disclosed architecture can handle partial failures, that is to say failures in which a link fails but another link connection between the same nodes does not fail. Such partial failures can be treated as failures of all links. Alternatively, different recovery modes can be effected according to the type of failure. If C2 or D2 alone fail, then no recovery is required, since C1 and D1 can successfully transmit all information. If all D1 alone fails, then Switch 1 and Switch 2 need not combine the traffic from C1 and C2. Instead, all nodes disconnected from D1 simply receive their traffic on D2. If C1 alone fails, then recovery is effected as for the case of failure of all links, except that the nodes may continue receiving on D1 alone.

A similar mechanism allows for recovery when a node fails or when two failures occur at different locations. In that case, some nodes, for instance the failed node or a node between two failures, may be unable to connect to the switches and other nodes. Nodes still connected to the switches can use the mechanisms described above to connect to maintain communication with the switches.

The present architecture also allows for recovery in the case of failure of a switch or of the card on a switch. If Switch 2 fails, no recovery action is necessary. If Switch 1 fails, then Switch 2 becomes the primary switch. In that case, Switch 2 may or may not operate as a slave from Switch 1. It receives on C2 rather than operates on traffic received from C1. Nodes receive on D2. The MSP architecture is well suited to handling the types of concurrent failures shown on FIG. 4. If several rings fail simultaneously, the MSP architecture allows for recovery to be performed in the same way on each ring. In particular, if splitters are used to transmit C1 to Switch 2 and C2 to Switch 1, then there is no need to have extra ports, and only the cabling costs are incurred.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A multiple switch protected architecture comprising:
   a ring;
   a plurality of switches on said ring;
   at least one node on said ring, each of said at least one node having at least four links; and
   an interconnection between said plurality of switches, wherein a first switch of said plurality of switches generates commands to a second switch of said plurality of switches across said interconnection, and wherein when one of the at least four links between a first node of the at least one node and a second node of the at least one node fails, in response to the one link failing, the first node transmits a first set of data to the first switch of the plurality of switches on a first link of the at least four links, the second node transmits a second set of data to the second switch of the plurality of switches on a second link of the at least four links, wherein the second switch provides a copy of the second set of data from the second node to the first switch and the first switch provides a copy of the first set data from the first node to the second switch via the interconnection, wherein the first node receives data from the first switch of the plurality of switches on a third link of the at least four links and wherein the second node receives data from the second switch of the plurality of switches on a fourth link of the at least four links.

2. The multiple switch protected architecture of claim 1 wherein one of said at least one node transmits data to other nodes and to the first switch of said plurality of switches on the first link of said at least four links.

3. The multiple switch protected architecture of claim 2 wherein said one of said at least one node transmits data to other nodes and to the second switch of said plurality of switches on the second link of said at least four links.

4. The multiple switch protected architecture of claim 3 wherein said one of said at least one node receives data from other nodes and from the first switch of said plurality of switches on the third link of said at least four links.

5. The multiple switch protected architecture of claim 4 wherein said one of said at least one node receives data from other nodes and from the second switch of said plurality of switches on the fourth link of said at least four links.

6. The multiple switch protected architecture of claim 2 wherein data provided on said first link is provided to said second switch.

7. The multiple switch protected architecture of claim 3 wherein data provided on said second link is provided to said first switch.

8. The multiple switch protected architecture of claim 1 wherein at least two links of said at least four links are selected from the group comprising separate fibers for each link, separate cables for each link, separate wavelengths for each link on the same fiber, separate counterpropagating wavelengths for each link on the same fiber, separate timeslots for each link on the same wavelength, and separate virtual links for each link.

9. A method of protecting a multiple switch architecture comprising:
   generating commands from a first switch of a plurality of switches to a second switch of the plurality of switches, the plurality of switches being connected with at least one node by a ring, wherein each of the at least one node has at least four links; and
   in response to failing of one of the at least four links between a first node and a second node of the at least one node, transmitting a first set of data from the first node to the first switch on a first link of the at least four links, transmitting a second set of data from the second node to the second switch on a second link of the at least four links, supplying from the second switch a copy of the second set of data from the second node to the first switch, supplying from the first switch a copy of the first set of data from the first node to the second switch, receiving at the first node data from the first switch on a third link of the at least four links, and receiving at the second node data from the second switch on a fourth link of the at least four links.

10. The method of protecting a multiple switch architecture of claim 9 further comprising transmitting data from one of said at least one node to other nodes and to the first switch of said plurality of switches on the first link of said at least four links.

11. The method of protecting a multiple switch architecture of claim 10 further comprising transmitting data from the one of said at least one node to other nodes and to the second switch of said plurality of switches on the second link of said at least four links.

12. The method of protecting a multiple switch architecture of claim 11 further comprising receiving data at the one of said at least one node from other nodes and from the first switch of said plurality of switches on the third link of said at least four links.

13. The method of protecting a multiple switch architecture of claim 12 further comprising receiving data at the one of said at least one node from other nodes and from the second switch of said plurality of switches on the fourth link of said at least four links.

14. The method of protecting a multiple switch architecture of claim 10 further comprising supplying data provided on said first link to said second switch.

15. The method of protecting a multiple switch architecture of claim 11 further comprising supplying data provided on said second link to said first switch.

16. The method of protecting a multiple switch architecture of claim 9 wherein at least two links of said at least four links are selected from the group comprising separate fibers for each link, separate cables for each link, separate wavelengths for each link on the same fiber, separate counterpropagating wavelengths for each link on the same fiber, separate timeslots for each link on the same wavelength, sand separate virtual links for each link.

* * * * *